US008417276B2

(12) United States Patent
Lane

(10) Patent No.: US 8,417,276 B2
(45) Date of Patent: *Apr. 9, 2013

(54) MOBILE STATION-CENTRIC METHOD FOR MANAGING BANDWIDTH AND QOS IN ERROR-PRONE SYSTEM

(75) Inventor: Richard Doil Lane, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 651 days.

This patent is subject to a terminal disclaimer.

(21) Appl. No.: 11/554,303

(22) Filed: Oct. 30, 2006

(65) Prior Publication Data

US 2007/0159521 A1 Jul. 12, 2007

Related U.S. Application Data

(63) Continuation of application No. 10/461,987, filed on Jun. 12, 2003, now Pat. No. 7,146,185.

(51) Int. Cl.
*H04B 7/00* (2006.01)

(52) U.S. Cl. ........ 455/522; 455/566; 455/260; 370/338; 370/328; 348/14.02

(58) Field of Classification Search .......... 370/331, 370/335, 342, 310, 349, 328, 350, 326, 338; 455/561, 452, 502, 403, 453, 553, 436, 552, 455/260, 566; 375/146, 240; 348/14.02
See application file for complete search history.

(56) References Cited

U.S. PATENT DOCUMENTS

| 4,901,307 | A | | 2/1990 | Gilhousen et al. |
| 5,103,459 | A | | 4/1992 | Gilhousen et al. |
| 6,167,273 | A | * | 12/2000 | Mandyam ..................... 455/450 |
| 6,275,471 | B1 | * | 8/2001 | Bushmitch et al. ........... 370/248 |
| 6,285,665 | B1 | * | 9/2001 | Chuah ........................... 370/319 |
| 6,522,628 | B1 | * | 2/2003 | Patel et al. ................. 370/230.1 |
| 6,574,211 | B2 | | 6/2003 | Padovani et al. |
| 6,640,248 | B1 | * | 10/2003 | Jorgensen ..................... 709/226 |
| 6,724,719 | B1 | * | 4/2004 | Tong et al. .................... 370/209 |
| 6,845,246 | B1 | * | 1/2005 | Steer ............................. 455/522 |
| 6,879,572 | B1 | * | 4/2005 | Ayyagari et al. ............. 370/335 |
| 6,937,591 | B2 | | 8/2005 | Guo et al. |
| 7,146,185 | B2 | * | 12/2006 | Lane .......................... 455/552.1 |
| 7,174,385 | B2 | * | 2/2007 | Li ................................. 709/231 |
| 8,204,079 | B2 | * | 6/2012 | Gardner et al. ............... 370/469 |
| 2002/0054578 | A1 | * | 5/2002 | Zhang et al. .................. 370/328 |
| 2003/0061368 | A1 | * | 3/2003 | Chaddha ....................... 709/231 |
| 2003/0219034 | A1 | * | 11/2003 | Lotter et al. .................. 370/469 |

(Continued)

OTHER PUBLICATIONS

Dapang Wu, et al. Scalable Video Coding and Transport over Broad-Band Wireless Networks, Proceedings of the IEEE, IEEE, New York, US, vol. 89, No. 1, Jan. 2001.

(Continued)

*Primary Examiner* — Mahendra Patel
(74) *Attorney, Agent, or Firm* — Stanton Braden

(57) ABSTRACT

A wireless transmission system for multimedia information having plural layers includes a base station (BTS) and a mobile station (MS) that can select which layers to transmit based on reported channel conditions, mobile location, and/or forward error correction (FEC) used for a particular layer. A respective FEC rate and/or power level can be dynamically established for each layer by a mobile station dependent on available bandwidth and/or reception and decoding capability of the BTS.

13 Claims, 2 Drawing Sheets

U.S. PATENT DOCUMENTS

| | | | |
|---|---|---|---|
| 2004/0014482 A1* | 1/2004 | Kwak et al. | 455/522 |
| 2004/0077311 A1 | 4/2004 | Riley | |
| 2004/0081198 A1* | 4/2004 | Gardner et al. | 370/468 |
| 2004/0081199 A1 | 4/2004 | Lopez et al. | |
| 2004/0083417 A1 | 4/2004 | Lane et al. | |
| 2004/0083495 A1 | 4/2004 | Lane et al. | |
| 2004/0093427 A1 | 5/2004 | Lopez et al. | |
| 2004/0114576 A1 | 6/2004 | Itoh et al. | |
| 2004/0179605 A1* | 9/2004 | Lane | 375/240.18 |
| 2004/0196972 A1* | 10/2004 | Zhu et al. | 380/45 |
| 2005/0020201 A1 | 1/2005 | Lane et al. | |
| 2006/0057994 A1 | 3/2006 | Anand | |
| 2006/0109901 A1* | 5/2006 | Ye et al. | 375/240.08 |
| 2008/0158337 A1* | 7/2008 | Richardson | 348/14.09 |

OTHER PUBLICATIONS

Osterberg, P. et al., Receiver-controlled joint source/channel coding on the application level, for video streaming over WLANs, 57th IEEE Semiannual Vehicular Technology Conference, VTC 2003, vol. 3, Apr. 25, 2003 pp. 1558-1561.

International Search Report PCT US0417555 International Search Authority US Dec. 6, 2005.

Shengjie Zhao et al., "Joint Error Control and Power Allocation for Video Transmission Over CDMA Networks With Multiuser Detection," IEEE Transactions on Circuits and Systems for Video Technology, vol. 12, No. 6, Jun. 2002.

Osterberg, et al., "Receiver-Controlled Joint Source/Channel Coding on the Application Level, for Video Streaming over WLANs", Apr. 25, 2003, pp. 1558-1561.

Wu: "Scalable Video Coding and Transport over Broad-Band Wireless Networks", Jan. 2001, vol. 89, No. 1, pp. 6-20.

Zhao: "Joint Error Control and Power Allocation for Video Transmission Over CDMA Networks With Multiuse Detection", IEEE Transactions on Circuits and Systems for Video Technology, vol. 12, No. 6, Jun. 2002, pp. 425-437.

Campbell A.T., et al., "Programmble Mobile Networks," Computer Networks, Elsevier Science, Publishers B.V., Amsterdam, NL, vol. 31 (7), Apr. 8, 1999, pp. 741-765, XP004304512.

Supplementary European Search Report—EP04776260—Search Authority—Munich—Aug. 22, 2006.

Written Opinion—PCT/US2004/017555—International Search Authority European Patent Office—Dec. 6, 2005.

* cited by examiner

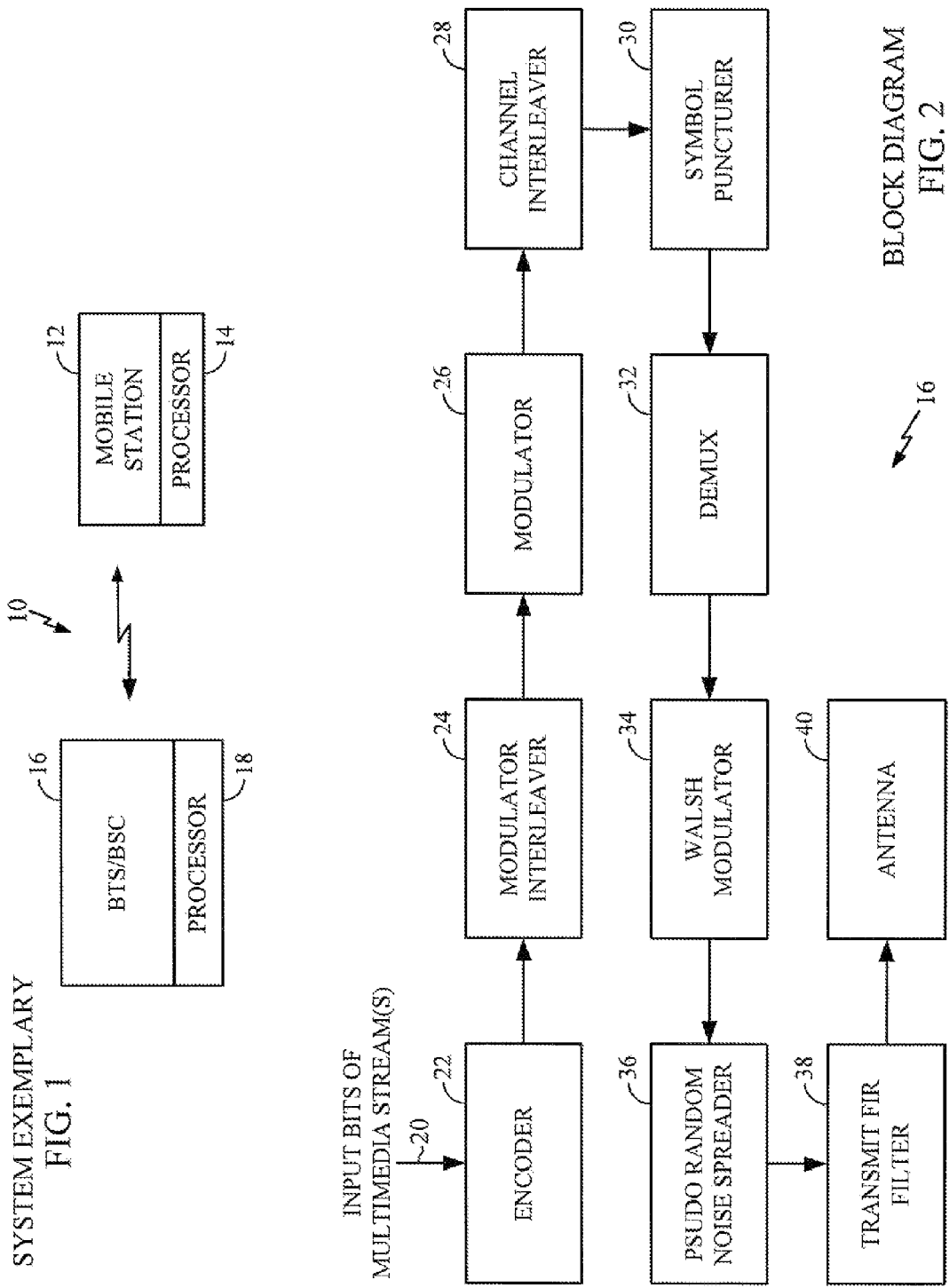

MOBILE STATION-CENTRIC METHOD FOR MANAGING BANDWIDTH AND QOS IN ERROR-PRONE SYSTEM

CROSS-REFERENCE TO RELATED APPLICATIONS

This application is a continuation of and claims the benefit of priority from, co-pending and commonly-assigned U.S. patent application Ser. No. 10/461,987, entitled "Mobile Station-Centric Method for Managing Bandwidth and QoS in Error-Prone System", which was filed on Jun. 12, 2003 now U.S. Pat. No. 7,146,185 and is fully incorporated herein by reference for all purposes.

BACKGROUND

1. Field of the Disclosure

The present disclosure relates generally to multimedia transmission.

2. Description of Related Art

Multimedia such as video and audio can be transmitted over a number of paths, including cable, the Internet, cellular and broadcast. For instance, satellite or terrestrial broadcast stations or cellular systems can be used to transmit multimedia to mobile computing devices such as mobile telephones. The multimedia data can be formatted in accordance with Moving Pictures Expert Group (MPEG) standards such as MPEG-1, MPEG-2 (also used for DVD format), MPEG-4 and other block based transform codes. Essentially, for individual video frames these multimedia standards use Joint Photographic Experts Group (JPEG) compression. In JPEG, the image of a single frame is typically divided into small blocks of pixels (usually 8×8S and/or 16×16 pixel blocks) that are encoded using a discrete cosine transform (DCT) function to transform the spatial intensity values represented by the pixels to spatial frequency values, roughly arranged, in a block, from lowest frequency to highest. Then, the DCT values are quantized, i.e. the information is reduced by grouping it into chunks by e.g., dividing every value by 10 and rounding off to the nearest integer. Since the DCT function includes a progressive weighting that puts bigger numbers near the top left corner of a block and smaller numbers near the lower right corner, a special zigzag ordering of values can be applied that facilitates further compression by run-length coding (essentially, storing a count of the number of e.g., zero values that appear consecutively, instead of storing all the zero values). If desired, the resulting numbers may be used to look up symbols from a table developed using Huffman coding to create shorter symbols for the most common numbers, an operation commonly referred to as "variable length coding". Other variable length coding schemes can be used as well, including Arithmetic coding. Motion pictures add a temporal dimension to the spatial dimension of single pictures. MPEG is essentially a compression technique that uses motion estimation to further compress a video stream. Other non-block-based encoding schemes such as wavelets, matching pursuits, etc can be used. Other forms of multimedia include audio, graphics, etc.

Internet Protocol (IP)-based principles such as point-to-point protocol (PP) framing of IP packets cart be used to communicate multimedia data, including MPEG data. PPP can be used not only for communicating IP packets over wired portions of the Internet, but also to communicate data over wireless transmission paths to user computers that employ wireless communication principles such as but not limited to code division multiple access (CDMA) technology, GSM, wideband CDMA (WCDMA or UMTS), OFDM and other wireless technologies.

Typically, multimedia data is voluminous, which means that significant transmission path bandwidth, unfortunately a finite resource, must be used. This is particularly the case for high fidelity multimedia, e.g., high resolution video. That is, the higher the quality of service (QoS) provided, the more bandwidth must be used.

As recognized by the present disclosure, several multimedia streams can be pooled together in a single channel. The channel might have a constant overall bandwidth in terms of bit rate, i.e., the number of bits that can be transmitted in the channel per unit time cannot exceed the "bandwidth" of the channel. Typically, each stream in the channel will be accorded a fixed fraction of the bandwidth. Accordingly the bit rate for each multimedia stream typically is fixed.

A "base layer" is an MPEG-related term that may be defined as the most important part of the multimedia bit stream which, if successfully received, decoded, and presented to the user, would result in a baseline level of video, audio, or other multimedia stream acceptable to the user. On the other hand, an "enhancement layer" would, when combined with the base layer, enhance or improve the quality, resolution, frequency, signal-to-noise ratio, etc. of the multimedia stream when presented to the user, compared to that of the base layer alone.

With the above discussion in mind, it will be appreciated that in wireless transmission of multimedia to battery powered mobile devices, three goals—efficient bandwidth use, mobile device power consumption, and highest QoS—compet with each other. This is particularly true when one considers that wireless channels are more "lossy" (they experience more lost data) than wired channels. To guarantee some higher levels of QoS, extra bandwidth might be required of retransmission of lost data. The alternative is to accept lost data frames and, hence, reduced QoS. These problems become more severe the further a receiver is Thorn a base station, and with high use channels. As an alternative to retransmission, a software application in a receiver experiencing reduced QoS can attempt to execute advanced error correction schemes, but this in turn drains the battery of the receiver by requiring the RF receiver to be on longer and requiring more complex decoding, and may still result in unacceptably low QoS. Having recognized these problems, the below-described solutions to one or more of them are provided herein.

SUMMARY

A wireless transmission system for multimedia information having plural layers includes a: mobile station (MS) that selects which layers to transmit either to or from the mobile station based on channel conditions and/or mobile location, and/or mobile station limitations, and/or user priority, and/or content priority, and/or billing plans, and/or forward error correction (FEC) used for a particular layer The MS may also energize its radio only as long as necessary to receive preselected portions of the multimedia based on an actual error rate and/or power in received data, and/or a forward error correction (FEC) rate.

In a preferred non-limiting embodiment, if an actual error rate at least equals a threshold for a particular layer, the MS energizes its radio only during periods containing information pertaining to layers other than the particular layer such that mobile stations energize their radios only to capture layers they can use, thereby conserving mobile station batter life and decoding processing power. The MS may energize its radio only during periods in which layers which employ sufficient FEC and/or power to be received demodulated and decoded are present for reception.

In another aspect, a method for transmission of multimedia data characterized by at least a base layer and at least one enhancement layer includes receiving, from at least one base station (BTS), information representing at least one actual operational parameter associated with the multimedia data. The method also includes dynamically establishing, at a mobile station (MS), an error correction rate and/or a power level of at least one layer of the multimedia data based at least in part on the information representing at least one actual operational parameter.

In yet another aspect, a mobile station (IS) for wirelessly transmitting digital multimedia having at least N layers to at least one base station (BTS) includes means for transmitting only N−1 layers or fewer, based on at: least one of: FEC rates, power levels, channel conditions, mobile location, mobile station limitations, user priority, content priority and billing plans, sufficient to allow the layers to be successfully received, demodulated, and decoded by the BTS.

In another aspect, a mobile station (MS) for wirelessly receiving digital multimedia having at least N layers from at least one base station (BTS) includes means on the MS for instructing the BTS to transmit only N-1 layers or fewer, based on at least one of: FEC rates, power levels, channel conditions, mobile location, mobile station limitations, user priority, content priority, and billing plans, sufficient to allow the layers to be successfully received, demodulated, and decoded by the MS. It is to be appreciated that a mobile station user may choose to have only a portion of the multimedia stream transmitted to the MS form the BTS (e.g. a user who wishes just to listen to the audio portion of a television program without viewing it).

The details of the present disclosure, both as to its structure and operations can best be understood in reference to the accompanying drawings, in which like reference numerals refer to like parts, and in which:

BRIEF DESCRIPTION OF THE DRAWINGS

FIG. 1 is a block diagram of the present architecture;
FIG. 2 is a block diagram of an exemplary non-limiting transmitting system.

DETAILED DESCRIPTION

Figure 3:
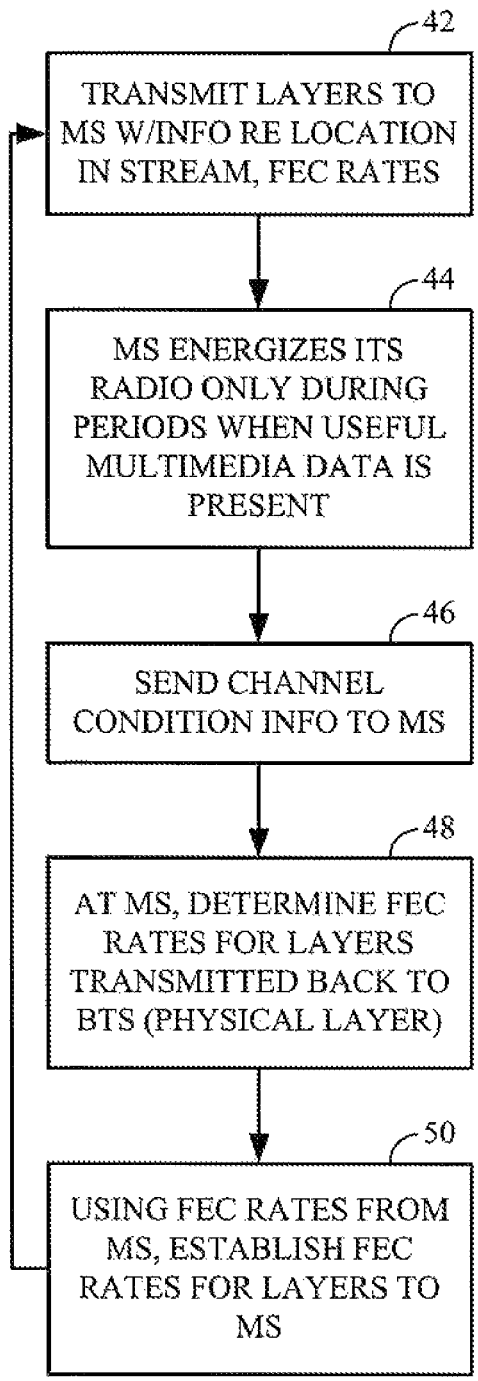
FIG. 3 is a flow chat of the present logic.

Referring initially to the non-limiting preferred embodiment shown in FIG. 1, a system 10 includes at least one mobile station 12; having at least one processor 14 and at least one base station (BTS) 16 transmitting digital multimedia streams and having a processor 18. In some implementations the BTS 16 may be a combined BTS and base station controller (BSC).

The preferred non-limiting BTS 16, uses wireless means, and more particularly uses code division multiple access (CDMA) principles. The streams can be broadcast or multicast to plural mobile stations 12 if desired, or transmitted using point-to-point wireless transmission principles, or multicast to groups of users. It is to be understood that the present principles apply to other forms of wireless communication such as GSM, TDMA, wideband CDMA, OFDM, etc. as well as transmission of multimedia over cable systems, the Internet, etc. As used herein the singular, "multimedia stream" means a single stream representing a single program, e.g., a single music piece or a single television show or movie potentially with accompanying text, images, and the like.

In one non-limiting preferred implementation the system 10 is a code division multiple access (CDMA) system that, e.g., uses cdma2000, cdma2000 3x, or cdma2000 high data rate (HDR) principles, or other CDMA principles. In one non-limiting embodiment the mobile station 12 is a mobile telephone made by Kyocera, Samsung, or other manufacturer that uses Code Division Multiple Access (CDMA) principles and CDMA over-the-air (OTA) communication air interfaces. The present disclosure, however, applies to other mobile stations such as laptop computers, wireless handsets or telephones, data transceivers, or paging and position determination receivers. The mobile station 12 can be hand-held or portable as in vehicle-mounted (including cars, trucks, boats, planes, trains), as desired. However, while wireless communication devices are generally viewed as being mobile, it is to be understood that the present disclosure can be applied to "fixed" units in some implementations. Also the present disclosure applies to data modules or modems used to transfer voice and/or data information including digitized video information, and may communicate with other devices using wired or wireless links. Further, commands might be used to cause modems or modules to work in a predetermined coordinated or associated manner to transfer information over multiple communication channels. One example could be to transfer different layers over different channels including different physical layers of different communication systems, as set forth in U.S. patent application Ser. Nos. 10/283,990 (now abandoned, published as U.S. Publication No, 2004-0081199), and 10/283,876 (now abandoned, published as U.S. Publication No. 2004-0093427), which are incorporated herein by reference. Wireless communication devices are also sometimes referred to as user terminals, mobile stations mobile units subscribes units, mobile radios or radiotelephones, wireless units, or simply as "users" and "mobiles" in some communication systems. It is to be understood that the present disclosure applies equally to other types of wireless devices including without limitation GSM devices, time division multiple access (TDMA) systems, OFDM (802.11) and the like.

Now referring to FIG. 2, which shows a transmitting system that can be used by either the MS 12 or BTS 16, input bits 20 contain the information representing layered multimedia streams. Each multimedia stream may include a base layer providing a minimum quality of service (QoS) and one or more enhancement layers providing heightened QoS. Layers can also contain respective portions of a compound multimedia program such as video, audio, graphics, text, and the like.

The bits 20 are sent to an encoder 22. The encoder 22 can be a Forward Error Correction (FEC) encoder that introduces redundancy in the bits 20 using convolutional coding techniques knot in the art. To do this, the preferred encoder 22 may establish, under the control of the BTS processor 18, an error correct-ion rate that essentially generates more redundancy for greater robustness at the cost of requiring increased bandwidth to support the larger number of bits, or that generates less redundancy to conserve bandwidth at the cost of risking more uncorrectable errors at the receivers. Thus, the redundancy introduced by the encoder 22 enables the mobile stations 12 to correct some detection errors without the need to increase transmission power.

The output of the encoder 22 is generally referred to as "code symbols." Generally, a single message data bit 20 input to the encoder 22 corresponds to one or more code symbols output from the encoder 22. In an alternative approach, the encoder 22 performs a "source encoding" function prior to the redundancy encoding discussed above. Source encoding involves performing data compression for efficient representation of input data bits 20 prior to introducing redundancy and the generation of code symbols.

A modulation interleaver 24 receives code symbols from the encoder 22 and "interleaves" the code symbols prior to processing by a modulator 26. In the example system shown, the interleaver 24 may be a block interleaver or a convolutional interleaver.

The interleaved code symbols are passed on to the modulator 26. In wireless digital communications, a number of different, but related, modulation schemes can be used in the modulator 26. For example, Binary Phase Shift Keying (BPSK), Differential Phase Shift Keying (DPSK), Quadrature Phase Shift Keying (QPSK) (including OQPSK and n/4QPSK), and Quadrature Amplitude Modulation (QAM), are digital modulation techniques which can be used in the modulator 26 to modulate the code symbols generated by the modulation interleaver 24. However, the modulator 26 is not limited to any specific type of modulator and can be any of the many digital modulators used in wireless communications. The present disclosure can also be applied to wired systems.

If desired, the channel interleaved symbols from the interleaver 28 may be passed on to a symbol puncture element 30, which can insert control information, such as power control information, in the data for proper handling of the communications between the transmitter and the receiver. The control symbols punctured into the message symbols can be time division multiplexed into the message symbols as disclosed in U.S. patent application Ser. No. 10/616,585 (now abandoned, published as UPS. Publication No. 2005-0020201), which is incorporated herein by reference.

If further desired, the symbol stream output by the symbol puncture element 30 can be sent to a demultiplexer (DEMUX) 32, which can be used for demultiplexing the input symbol stream into a number of parallel output symbol streams. In the exemplary BTS 16 shown in FIG. 2, the DEMUX 32 may be a one-to-sixteen demultiplexer.

From the DEMUX 32, particularly for BTS applications, the streams are sent to a Walsh function modulator 34 (that can include a Walsh function matrix of, e.g., order 16). In other embodiments, a Walsh function matrix of other orders such as 64 or 128 may be used. It is noted that, in the exemplary system 10: the parallel outputs of the DEMUX 32 can correspond to a single user or multimedia layer or program, or plural different users/streams/layers. In any case, Walsh modulation is performed on each of the parallel input symbols coning from the DEMUX 32, which is used to transform each input symbol into a respective sequence of output signals where each sequence of output signals is orthogonal with every other sequence of output signals.

As shown in FIG. 2, a Pseudorandom Noise (PN) spreader 36 may be provided to "spread" the signal tin accordance with principles known in the art. The general principles of CDMA communication systems, and in particular the general principles for generation of spread spectrum signals for transmission over a communication channel is described in U.S. Pat. No. 4,901,307 entitled "Spread Spectrum Multiple Access Communication System Using Satellite or Terrestrial Repeaters" and assigned to the assignee of the present disclosure. The disclosure in that, patent, i.e. U.S. Pat. No. 4,901,307 is hereby fully incorporated by reference into the present disclosure. Moreover, U.S. Pat. No. 5,103,459 entitled "System and Method for Generating Signal Waveforms in a CDMA Cellular Telephone Systems" and assigned to the assignee of the present disclosure, discloses principles related to PN spreading, Walsh covering, and techniques to generate, CDMA spread spectrum communication signals. The disclosure in that patent, i.e. U.S. Pat. No. 5,103,459, is also hereby fully incorporated by reference into the present disclosure. Further, the present disclosure utilizes time multiplexing of data and various principles related to "high data rate" communication systems, and the present disclosure can be used in a "high data rate" communication systems disclosed in U.S. Pat. No. 6,574,211 entitled "Method and Apparatus for High Rate Packet Data Transmission," and is also hereby fully incorporated by reference into the present disclosure.

From the PN spreader 36 the signal may be sent to a finite impulse response (FIR) filter 38, which may be a FIR filter used for pulse shaping signals prior to their transmission over a communication channel. The output of the transmit FIR filter 38 is sent through an antenna 40 across the communication channel 7 to the receivers). The communication channel usually refers to the physical medium which is used to send the signals from the transmitter to the receiver.

Now % referring to FIG. 3, an exemplary non-limiting implementation of the present logic is shown, it being understood that the logic could be depicted in other ways. In essence, the logic is executed by one or both of the processors 14, 18 to select which layers of multimedia streams to transmit or received based on channel conditions, and/or mobile station location, and/or the forward error correction (FEC) used for a particular layer, and/or mobile station user preferences, user priority, content priority, and billing plans. Also, in multicasting applications, the determination can be based on location and number of users in the multicast group. The time that a mobile station 12 receiver is on during transmission and reception of multimedia signals can thus be minimized to reduce power consumption and control bandwidth consumption in the cellular system in accordance with U.S. patent application Ser. Nos. 10/632,637 (published as U.S. Publication No. 20040077311) and 10/798,620 (published as U.S. Publication No. 2004-0179605), incorporated herein by reference. The BTS; 16 can employ different FEC rates and/or different power levels for the various layers upon request from the mobile stations, depending on available bandwidth and current channel usage and priorities, in accordance with U.S. patent application Ser. Nos. 10/283,931 (published as U.S. Publication No 2004-008349-5) and 10/283,904 (now abandoned, published as U.S. Publication No. 2004-0083417), incorporated herein by reference.

With the above general description of the logic in mind, commencing at block 42 of FIG. 3, multimedia layers are transmitted by the BTS 16 along with information identifying where in the stream groups of packets of each layer has been inserted. Also, if desired each layer can be transmitted with its own respective FEC rate and/or power level, and these rates can also be identified in the transmitted stream.

Also, a MS may signal the BTS to inform it which layers the MS can use and/or which layers are to be transmitted. If the connection is a point-to-point connection, the BTS can transmit only the requested layers at the requested FEC rates (e.g., audio only or text only at very low FEC rates). If the MS is part of a multicast group, the BTS can use the data from all the MS to decide which layers at which FEC rates to transmit, e.g., base layers only.

Using the temporal position information relating to when portions of each, layer appear in the stream, at block 44 the MS 12 can energize its radio only so long as necessary to receive usable data. For example, an MS 12 might find that an enhancement layer contains too many errors to be usable, and thus would energize its radio only during periods when base layer portions are transmitted. The MS also saves power by not demodulating, or not channel decoding, or not source decoding the unneeded/unwanted layers. Or, an MS 12 might determine that a layer has a FEC rate and/or power level that is insufficient for the purposes of the MS 12 application, or that is such that undue decoding would be required to use the layer. In any case, the MS 12 samples only the portions of the stream that can be easily decoded and reconstructed by seeking the portions of the streams with insufficient FEC rates to guarantee a reliable stream of data.

Moving to block 46, feedback may also be sent from the BTS 16 to the MS 112 over an access channel, a paging channel, an overhead channel, or other channel. The feedback represents one or more actual operational parameters associated with the multimedia data, such as channel conditions as might be indicated by; e.g., interference, actual data error rates being experienced, multipath interference, power levels, etc. The feedback can also indicate actual or desired FEC rate anti/or power in the received data, as well as information relating to the position of the mobile station 12.

Based on this feedback, the MS 12 can ascertain which multimedia layers to transmit back to the BTS 12, and/or the most; appropriate FEC rate and/or power for each layer, at block 48. More specifically, the MS 12 can reduce the amount of time needed to transmit multimedia by only transmitting the layers that employ sufficient FEC rates/power levels to be received, demodulated and decoded by the BTS 16, saving bandwidth as well. Accordingly, the MS 12 may selectively transmit back to the BTS 16 only a subset of the layers that may be available for transmission.

Moving to block 50, the BTS 166 may use the FEC rate information from the data received from the MS 12 to vary or otherwise dynamically establish the FEC rates and/or power levels for the layers it is transmitting. As understood herein this further reduces MS power consumption and bandwidth consumption. The logic may periodically loop back to block 42.

As mentioned above, instead of establishing FEC rate layer by layer, the principles advanced herein can be used to: establish: a power for each layer that is transmitted. This in disclosure results in power savings on the mobile device reduced over-the-air (OTA) RF radio power consumption, reduced OTA receiver demodulator power, OTS receiver decode power, and multimedia application decode savings. In addition, the presents disclosure provides increased control over bandwidth allocation to users and multicast groups as well as overall savings of system bandwidth and/or system spectrum.

While the particular MOBILE STATION-CENTRIC METHOD FOR MANAGING BANDWIDTH AND QoS IN ERROR-PRONE SYSTEM as herein shown and described in detail is fully capable of attaining the above-described objects of the disclosure, it is to be understood that it is; the presently preferred embodiment of the present disclosure and is thus representative of the subject matter which is broadly contemplated by the present disclosure, that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated wherein by reference and are intended to be encompassed by the present claims. Moreover it is not necessary for a device or method to address each and every problem sought to be solved by the present, disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. Section 112, sixth paragraph, unless the element is expressly recited using the phrase "means for" or in the case of a method claim, the element is recited as a "step" instead of an "act".

What is claimed is:

1. A method for transmission of multimedia data from a mobile station comprising:

receiving at a mobile station (MS), from at least one base station (BTS), information representing at least one operational parameter associated with the multimedia data, wherein operational parameters may comprise an error rate, a channel condition, an MS location, a mobile station limitation, a user priority, a content priority, a billing plan, and a forward error correction (FEC) rate;

dynamically establishing, at the MS, at least one characteristic of a base layer and/or an enhancement layer of the multimedia data based on the received operational parameter information; and selecting which of the base and/or enhancement layers to be transmitted to the BTS based on the received operational parameter information, and selecting a transmit power level and/or a FEC rate for each layer to be transmitted based on the received operational parameter information in order to save power.

2. The method of claim 1, wherein the step of dynamically establishing includes establishing a base forward error correction rate for the base layer and an enhancement forward error correction rate for the at least one enhancement layer.

3. An apparatus for transmission of multimedia data from a mobile station comprising:

means for receiving at a mobile station (MS), from at least one base station (BTS), information representing at least one operational parameter associated with the multimedia data wherein operational parameters may comprise an error rate, a channel condition, an MS location, a mobile station limitation, a user priority, a content priority, a billing plan, and a forward error correction (FEC) rate;

means for dynamically establishing, at the MS, at least one characteristic a base layer and/or an enhancement layer of the multimedia data based on the received operational parameter information;

and means for selecting which of the base and/or enhancement layers to be transmitted to the BTS based on the received operational parameter information, and selecting a transmit power level and/or a FEC rate for each layer to be transmitted based on the received operational parameter information in order to save bower.

4. A non-transitory computer-readable medium including computer-operable instructions for transmission of multimedia data comprising:

instructions for receiving at a mobile station (MS), from at least one base station (BTS), information representing at least one actual operational parameter associated with the multimedia data wherein operational parameters may comprise an error rate, a channel condition, an MS location, a mobile station limitation, a user priority, a content priority, a billing plan, and a forward error correction (FEC) rate;

instructions for dynamically establishing at the MS at least one characteristic of a base and/or enhancement layer of the multimedia data based on the received operational parameter information; and instructions for selecting which of the base and/or enhancement layers to be transmitted to the BTS based on the received operational parameter information, and selecting a transmit power level and/or a FEC rate for each layer to be transmitted based on the received operational parameter information in order to save power.

5. The non-transitory computer readable medium of claim 4, wherein the instructions for dynamically establishing at the MS at least one characteristic of at least one layer of the multimedia data based at least in part on the received information include instructions for establishing a base forward error correction rate for the base layer and an enhancement forward error correction rate for the at least one enhancement layer.

6. A processing apparatus capable of performing logic operations for transmission of multimedia data in at least one mobile station that results in power savings on a mobile device, by establishing a power for each layer transmitted instead of establishing FEC rate layer by layer characterized by at least a base layer and at least one enhancement layer stored thereon, comprising:
a processor;
a memory coupled to the processor,
wherein the processor is configured with software instructions to perform logic operations comprising:
receiving at a mobile station (MS), from at least one base station (BTS), information representing at least one operational parameter associated with the multimedia data, wherein operational parameters include: an error rate, a channel condition, an MS location, a mobile station limitation, a user priority, a content priority, a billing plan, and a forward error correction (FEC) rate;
dynamically establishing, at the MS, at least one characteristic of a base layer and/or an enhancement layer of the multimedia data based on the received operational parameter information; and
selecting which of the base and/or enhancement layers to be transmitted to the BTS based on the received operational parameter information, and selecting a transmit power level and/or a FEC rate for each layer to be transmitted based on the received operational parameter information in order to save power.

7. The processing apparatus of claim 6, wherein the processor is configured with software instructions to perform logic operations comprising:
establishing a base forward error correction rate for the base layer and an enhancement forward error correction rate for the at least one enhancement layer.

8. The method of claim 1, wherein the information representing the at least one actual operational parameter associated with the multimedia data is indicative of a redundancy or power level of a layer of the multimedia data sufficient for the BTS to reliably receive the layer.

9. The apparatus of claim 3, wherein the information representing the at least one actual operational parameter associated with the multimedia data is indicative of a redundancy or power level of a layer of the multimedia data sufficient for the BTS to reliably receive the layer.

10. The non-transitory computer-readable medium of claim 4, wherein the information representing the at least one actual operational parameter associated with the multimedia data is indicative of a redundancy or power level of a layer of the multimedia data sufficient for the BTS to reliably receive the layer.

11. The apparatus of claim 3, wherein the means for dynamically establishing includes means for establishing a base forward error correction rate for the base layer and means for establishing a forward error correction rate for the at least one enhancement layer.

12. An apparatus for transmission of multimedia data from a mobile, comprising:
a receiver for receiving at a mobile station (MS), from at least one base station (BTS), information representing at least one operational parameter associated with the multimedia data wherein operational parameters may comprise an error rate, a channel condition, an MS location, a mobile station limitation, a user priority, a content priority, a billing plan, and a forward error correction (FEC) rate;
a processor for dynamically establishing, at the MS, at least one characteristic a base layer and/or an enhancement layer of the multimedia data based on the received operational parameter information; and
a selector for selecting which of the base and/or enhancement layers to be transmitted to the BTS based on the received operational parameter information, and selecting a transmit power level and/or a FEC rate for each layer to be transmitted based on the received operational parameter information in order to save power.

13. The apparatus of claim 12, wherein the information representing the at least one actual operational parameter associated with the multimedia data is indicative of a redundancy or power level of a layer of the multimedia data sufficient for the BTS to reliably receive the layer.

* * * * *